United States Patent [19]
Dill

[11] Patent Number: 4,659,831
[45] Date of Patent: Apr. 21, 1987

[54] PROCESS FOR THE PREPARATION OF ANTHRAQUINONE IMIDES

[75] Inventor: Bernd Dill, Rheinfelden, Fed. Rep. of Germany

[73] Assignee: Ciba-Geigy AG, Basel, Switzerland

[21] Appl. No.: 657,104

[22] Filed: Oct. 2, 1984

[30] Foreign Application Priority Data

Oct. 6, 1983 [SE] Sweden ................. 5432/83

[51] Int. Cl.$^4$ ............... C07C 97/24; C07D 471/22
[52] U.S. Cl. .................... 546/31; 260/354; 260/358; 260/362; 260/367; 260/368
[58] Field of Search ............... 260/367, 357, 368, 358, 260/362; 546/31

[56] References Cited

U.S. PATENT DOCUMENTS 2,174,751 10/1939 Koeberle, II ............... 260/367
2,199,566 5/1940 Koeberle et al. ............ 260/367
2,420,022 5/1947 Tinker et al. ............... 260/367
2,585,682 2/1952 Randall et al. .............. 260/367
4,382,034 5/1983 Reubke et al. .............. 260/367

FOREIGN PATENT DOCUMENTS 47205 3/1982 European Pat. Off. ............ 260/367

Primary Examiner—Glennon H. Hollrah
Assistant Examiner—Raymond Covington
Attorney, Agent, or Firm—Wenderoth, Lind & Ponack

[57] ABSTRACT

The invention relates to a process for the preparation of anthraquinone imides by condensing vattable anthraquinone compounds which contain at least one primary amino group with aromatic halogen compounds, in an organic solvent and at elevated temperature in the presence of a base and a copper catalyst. The process comprises first carrying out the condensation until a reaction of 60–95% has taken place, and then subjecting the reaction mixture, without isolating the reaction product, to an aftertreatment at a temperature which is 5° to 60° C. above the initial temperature of the condensation. This process permits the anthraquinone imides to be obtained in increased yield and additionally provides products with improved qualities. The intermediates so obtained can be further processed to vat dyes.

8 Claims, No Drawings

PROCESS FOR THE PREPARATION OF ANTHRAQUINONE IMIDES

Many anthraquinone imides are prepared by condensing a vattable anthraquinone compound which contains at least one primary amino group with an aromatic halogen compound. The condensation is conveniently carried out at elevated temperature in an organic solvent and in the presence of a base and a copper compound. However, this process has the drawback that the condensation reaction does not proceed quantitatively, so that the condensation products obtained are badly contaminated by e.g. starting materials.

It is the object of the present invention to provide a process which does not have or which reduces the aforementioned disadvantage. This object is achieved by subjecting the condensation product, without first isolating it, to an aftertreatment at elevated temperature. Surprisingly, products of substantially greater purity and colour strength are thereby obtained, even if the educts are used in stoichiometric amount.

Accordingly, the present invention relates to a process for the preparation of anthraquinone imides by condensing vattable anthraquinone compounds which contain at least one primary amino group with aromatic halogen compounds, in an organic solvent and at elevated temperature, in the presence of a base and a copper catalyst, which process comprises carrying out the condensation until 60–95% reaction has taken place, and then subjecting the reaction mixture, without isolating the reaction product, to an aftertreatment at a temperature which is 5° to 60° C. above the initial temperature of the condensation.

The vattable anthraquinone compounds containing at least one primary amino group can carry the customary substituents of vat dyes, e.g. halogen, alkyl or alkoxy, or acylamino such as acetylamino and benzoylamino and also fused benzene rings. Preferably, such compounds are aminoanthraquinones, e.g. 1-aminoanthraquinone, 1,4- and 1,5-diaminoanthraquinone, 1-amino-4-benzoylaminoanthraquinone and 1-amino-5-benzoylaminoanthraquinone.

Suitable aromatic halogen compounds are those in which the halogen atom is attached direct to the aromatic nucleus. Particularly suitable aromatic halogen compounds of this type are halogenated anthraquinone, benzanthrone, anthanthrone, pyranthrone, dibenzanthrone, phthaloylacridone, flavanthrone, dibenzpyrenequinone and isoviolanthrone, which compounds may be further substituted by customary substituents of vat dyes and are in particular dihalogenated, preferably dibrominated, benzanthrone and dihalogenated, preferably dichlorinated, anthraquinone.

The aromatic halogen compound and the vattable anthraquinone compound are conveniently employed in approximately stoichiometric amounts. However, an excess of e.g. 10% of one of the components is possible.

The condensation reeaction is carried out at elevated temperature, preferably above 150° C., in an inert solvent such as sulfolane or preferably nitrobenzene, in the temperature range from 180° to 210° C. under normal pressure.

Suitable copper catalysts are metallic copper and copper compounds, e.g. copper oxide or copper(I) chloride. The copper catalyst can be added to the reaction mixture in several portions, spread over the reaction time. The amount of each portion of catalyst may be identical or, for example, increase or decrease from the first to the last portion. It is also possible to add the copper catalyst continuously during the entire reaction or during individual phases of the reaction. This process variant shall also be understood as meaning "addition in several portions". When using components which react vigorously with each other it is advisable to add initially smaller portions than those later employed. It is preferred to add the catalyst in 5 to 20 equal portions, the first portion at the start of the reaction and the subsequent remaining ones being added at approximately equal intervals of time. The copper catalyst can be added in solid form or also as a suspension, e.g. as a suspension in nitrobenzene.

The condensation reaction is carried out in the presence of a base. Examples of suitable bases are sodium bicarbonate, potassium bicarbonate, sodium acetate, potassium acetate, sodium carbonate and potassium carbonate as well as mixtures of such compounds.

In the process of this invention, the reaction mixture is subjected to an aftertreatment after 60 to 95% reaction has taken place during the condensation. This aftertreatment, over about 2 to 5 hours, is effected at elevated temperature, optionally under overpressure. The elevated temperature during the aftertreatment is, in principle, above the initial temperature of the condensation, preferably 5° to 60° C., most preferably 10° to 40° C., above the initial temperature. When carrying out the condensation reaction in nitrobenzene in the temperature range from about 180° to 210° C., the aftertreatment is effected e.g. in a temperature range from 215° to 250° C. The elevated temperature gives rise to an overpressure of about 0.3 to 3.0 bar.

The condensation products are isolated in conventional manner following the aftertreatment of this invention, for example by removing the solvent by steam distillation and then filtering off the condensation product and drying it.

Compared with the known procedures without an aftertreatment, an increase in yield of 5 to 20 percent by weight, based on the amino compound employed, is achieved with the process of this invention. Furthermore, products with improved qualities are obtained, for example greater purity and higher colour strength.

The anthraquinone imides obtained by the process of the invention are mostly dyestuff intermediates. After conversion to carbazole or acridine derivatives they yield vat dyes which are used for dyeing and printing textile materials such as cotton.

If mixtures of the aromatic halogen compounds are used in the process of this invention, then it is possible to control the shade of the vat dye which is obtained from the anthraquinone imide as a consequence of the quantitative reaction of the aromatic compound with the vattable anthraquinone compound.

In the following Examples parts and percentages are by weight.

EXAMPLE 1

A reaction vessel is charged at a temperature below 80° C. with 5000 parts of nitrobenzene and then 600 parts of 3,8-dibromobenzanthrone (dry) are added via a metering device. Then 705 parts of 1-aminoanthraquinone, 250 parts of anhydrous sodium carbonate and 7 parts of copper(I) chloride are added. With stirring, the reaction mixture is heated slowly under normal pressure to 190° C. and then, at this temperature, a further 7 parts of copper(I) chloride are added. The batch is then heated to 210° C. and water is distilled off for 3 hours under reflux without pressure.

The contents of the reaction vessel are heated to 225° C., whereupon the pressure rises to 0.6 to 0.8 bar and the reaction mixture is stirred for another 2 hours under these conditions. The batch is cooled and the reaction product dried, affording 1040 parts (100% yield, based on 3,8-dibromobenzanthrone) of the anthraquinone imide of the formula

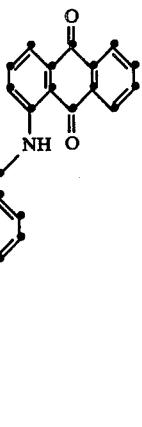

The above anthraquinone imide is subjected to an acridine cyclisation, in known manner, in an alkali melt. The product so obtained can then be used for dyeing e.g. cotton in olive green shades.

If the above procedure is repeated, but without carrying out an aftertreatment, then only about 95% of the 1-aminoanthraquinone reacts. The anthraquinone imide therefore additionally contains the reaction product of 1 mole of 1-aminoanthraquinone with 1 mole of 3,8-dibromobenzanthrone as well as free 1-aminoanthraquinone. The colour strength of the vat dye prepared in the subsequent alkali melt is at least 10% weaker and, because of the impurities, an alternating shade and a poorer resist on polyester are obtained.

EXAMPLE 2

A reaction vessel is charged with 5000 parts of nitrobenzene to which are added 428.5 parts of 1,5-dichloroanthraquinone, 670 parts of 1-aminoanthraquinone, 250 parts of anhydrous sodium carbonate and 10 parts of copper(I) chloride. With stirring, the mixture is heated to 190° C. and a further 10 parts of copper(I) chloride are added. After reflux distillation without pressure over 5 hours, the reaction mixture is heated to 240° C. and the pressure rises to 2 bar. Stirring is continued for 4 hours under these conditions. The reaction mixture is cooled and the reaction product is isolated and dried, affording 976 parts (97% yield, based on 1,5-dichloroanthraquinone) of the anthraquinone imide of the formula

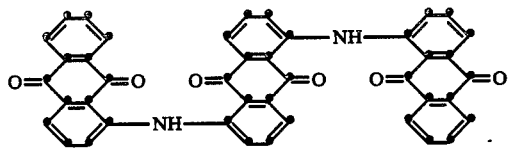

This anthraquinone imide is converted into a yellow vat dye by a double carbazole cyclisation.

If the above procedure is repeated, but without effecting an aftertreatment, then only about 80% of the 1-aminoanthraquinone reacts. As in Example 1, the incomplete reaction in the anthrimide stage results in a dye of weaker colour strength and marked deterioration in purity and shade compared with the product obtained in this Example.

EXAMPLE 3

A reaction vessel is charged with 220 parts of nitrobenzene to which are added 176.4 parts of 1,5-dichloroanthraquinone, 236 parts of 1-aminoanthraquinone, 42.0 parts of 1,5-diaminoanthraquinone, 340 parts of 1-chloroanthraquinone, 154 parts of sodium carbonate and 14 parts of copper(I) chloride. With stirring, the mixture is heated to 190° C. After reflux distillation for 2 hours without pressure, the reaction mixture is heated to 240° C. and the pressure rises to 2 bar. Stirring is continued for 3 hours under these conditions. The reaction mixture is cooled and the reaction product is isolated and dried, affording 466 parts of a mixture of anthraquinone imides.

By means of a double carbazole cyclisation, the above anthraquinone imide is converted into a vat dye which dyes cotton in a yellowish brown shade.

EXAMPLE 4

66.1 parts of 1-amino-4-benzoylamidoanthraquinone, 28.1 parts of 1,3-dichloro-2-methylanthraquinone, 33 parts of sodium carbonate and 1.6 parts of copper(I) chloride are suspended in 333 parts of nitrobenzene. This suspension is heated to 200°–205° C. over 1½ hours and stirred at this temperature for 1½ hours under normal pressure. The water of reaction is removed through a descending cooler. After the reaction vessel has been sealed, the reaction mixture is heated to 230°–235° C. under a pressure of 3 to 4 bar. The reaction mixture is kept under these conditions for another 5 hours, then cooled, and the nitrobenzene is removed by steam distillation. The reaction product is isolated by filtration and dried, affording 71.1 parts of a grey powder. The dye so obtained can be used for dyeing cotton in grey shades.

EXAMPLE 5

A reaction vessel is charged with 4600 parts of nitrobenzene to which are added, at a temperature below 30° C., 350 parts of brominated violanthrone (degree of bromination: 28–30%), 222 parts of 1-aminoanthraquinone and 193 parts of sodium carbonate. With stirring, the reaction mixture is heated to 200°–210° C. and this temperature is kept for 5 hours. During this time a total amount of 32.9 parts of copper(I) chloride in 588 parts of nitrobenzene are added in 7 portions. The water of reaction is distilled off. After heating to 230° C., the reaction suspension is stirred for another 3 hours under these conditions. The batch is then cooled and the nitrobenzene is removed by steam distillation. The reaction product is isolated by filtration and dried, affording 510 parts of a dyestuff mixture. This product can be used for dyeing cotton to give grey dyeings of good fastness properties.

EXAMPLE 6

The procedure described in Example 6 is repeated, using an equivalent amount of 3-bromobenzanthrone instead of brominated violanthrone, to give a dye which dyes cotton in olive shades.

EXAMPLE 7

The procedure described in Example 1 is repeated, using equivalent amounts of 1-chloroanthraquinone and 1,4-diaminoanthraquinone instead of dibromobenzanthrone and aminoanthraquinone, to give a dye which dyes cotton in brown shades.

EXAMPLE 8

55 parts of 1-benzamido-4-bromoanthraquinone, 45 parts of 1-amino-5-benzamidoanthraquinone, 10 parts of sodium carbonate and 1.4 parts of copper(I) chloride are suspended in 550 parts of nitrobenzene. With stirring, the mixture is heated to 190° C. and then a further 1.3 parts of copper(I) chloride are added. The reaction mixture is heated to 205° C. and stirred for 3 hours at this temperature while distilling off the water of reaction. The batch is then heated to 215° C. and the pressure rises to about 1 bar. Stirring is continued for another 2 hours under these conditions. The reaction mixture is then slightly cooled and the nitrobenzene is removed by distillation. The reaction product is dried, affording about 85 parts of anthrimide, which can be converted into a brown vat dye by carbazolation.

EXAMPLE 9

66 parts of 1-chloroanthraquinone, 60.5 parts of 1-aminoanthraquinone, 26.4 parts of sodium carbonate and 0.75 part of copper(I) chloride are suspended in 550 parts of nitrobenzene. With stirring, the mixture is heated to 190° C. and then a further 0.75 part of copper(I) chloride is added. The reaction mixture is heated to 206° C. and stirred for 3 hours at this temperature while distilling off the water of reaction. The batch is then heated to 214° C. and the pressure rises to about 1 bar. Stirring is continued for another 2 hours under these conditions. The reaction mixture is then cooled slightly and the nitrobenzene is removed by distillation. After drying there are obtained about 115 parts of anthrimide, which is suitable for further processing to give vat dyes.

What is claimed is:

1. In a process for the preparation of an anthraquinone imide by condensing a vattable anthraquinone compound which contains at least one primary amino group with a halogenated anthraquinone, benzanthrone, anthranthrone, pyranthrone, dibenzanthrone, phthaloylacridone, flavanthrone dibenzpyrenequinone or isoviolanthrone, which halogen compounds are unsubstituted or further substituted by halogen, alkyl, alkoxy, acylamino or fused benzene rings, at a temperature of 180° to 210° C. in an inert organic solvent in the presence of a base and a copper catalyst, the improvement which comprises first carrying out the condensation until a reaction of 60 to 95% has taken place, and then subjecting the reaction mixture, without isolating the reaction product, to an aftertreatment at a temperature of 215° to 250° C., the aftertreatment being carried out under overpressure.

2. A process according to claim 1, wherein an aminoanthraquinone is used as vattable anthraquinone compound containing a primary amino group.

3. A process according to claim 1, wherein the aftertreatment is carried out at a temperature which is 10° to 40° C. above the initial reaction temperature.

4. A process according to claim 1, wherein the aftertreatment is carried out under an overpressure of up to 3 bar.

5. A process according to claim 1, wherein a halobenzanthrone or haloanthraquinone is used as aromatic halogen compound.

6. A process according to claim 5 wherein the aromatic halogen compound is dibromobenzanthrone.

7. A process according to claim 5 wherein the aromatic halogen compound is dichloroanthraquinone.

8. A process according to claim 1, wherein the condensation reaction is carried out in nitrobenzene at a temperature of 180° to 210° C. under normal pressure.

* * * * *